US006810331B2

United States Patent
Bittar et al.

(10) Patent No.: US 6,810,331 B2
(45) Date of Patent: Oct. 26, 2004

(54) FIXED-DEPTH OF INVESTIGATION LOG FOR MULTI-SPACING MULTI-FREQUENCY LWD RESISTIVITY TOOLS

(75) Inventors: Michael S. Bittar, Houston, TX (US); Guoyu Hu, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 10/254,337

(22) Filed: Sep. 25, 2002

(65) Prior Publication Data
US 2004/0059514 A1 Mar. 25, 2004

(51) Int. Cl.[7] .............................. G01V 3/18
(52) U.S. Cl. .............................. 702/7
(58) Field of Search .................. 702/6, 7; 324/338, 324/339, 343

(56) References Cited

U.S. PATENT DOCUMENTS

| | | | |
|---|---|---|---|
| 6,181,138 B1 * | 1/2001 | Hagiwara et al. | 324/338 |
| 6,211,678 B1 * | 4/2001 | Hagiwara | 324/338 |
| 6,308,136 B1 * | 10/2001 | Tabarovsky et al. | 702/7 |
| 6,359,438 B1 * | 3/2002 | Bittar | 324/369 |
| 6,606,565 B1 * | 8/2003 | Strickland et al. | 702/7 |

OTHER PUBLICATIONS

Bittar et al., "Invasion Profiling With a Multiple Depth of Investigation Electromagnetic Wave Resistivity Sensor," Society of Petroleum Engineers, Inc., SPE 28425, 23 pages (1994).

Meyer, "Multi–Parameter Propagation Resistivity Interpretation," SPWLA 38TH Annual Logging Symposium, 14 pages (1997).

* cited by examiner

Primary Examiner—Donald McElheny, Jr.
(74) Attorney, Agent, or Firm—Conley Rose, P.C.; Mark E. Scott

(57) ABSTRACT

A system and related method for obtaining electromagnetic resistivity logs of a formation having fixed depths of investigation that differ from the actual depths of investigation for the tool. The system and related method comprises calculating actual invaded zone and formation resistivities, and then using least-squares curve fitting techniques to find a function that models the relationship between the physical spacing of the transmitters and the depths of investigation. Using the function, it is possible to find a transmitter-to-receive spacing that, though not actually wed, would give the desired depth of investigation. This transmitter-to-receiver spacing is then used in combination with a second function, determined using least-squares curve fitting methods, which models the relationship between the transmitter-to-receiver physical spacing and the measured resistivity to obtain the resistivity reading at a fixed depth of investigation.

22 Claims, 7 Drawing Sheets

FIXED-DEPTH OF INVESTIGATION LOG FOR MULTI-SPACING MULTI-FREQUENCY LWD RESISTIVITY TOOLS

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to downhole logging tools and logs created with the tools. More particular, the preferred embodiments are directed to logging-while-drilling (LWD) resistivity tools and logs created with the resistivity tools. More particularly still, the preferred embodiments of the present invention are directed to determining fixed depths of investigation for LWD tools having multiple spaced transmitters and receivers and using multiple frequencies.

2. Background of the Invention

In the days before logging-while-drilling (LWD) tools, information regarding downhole formations was gathered using wireline logging tools. One such wireline logging tool is a resistivity tool for determining resistivity of the downhole formation. Resistivity is generally determined at several depths of investigation, where the depths of investigation in a conventional wireline tool operating at a low frequency (near 20 kilo-hertz) are a function of the spacing between each transmitter and a receiver or receiver pair. Thus, to obtain multiple depths of investigation in a wireline tool, multiple transmitters are mounted on the wireline device at spaced-apart locations from the receivers. FIG. 1 illustrates an array induction tool with multiple transmitter-receiver spacings. Software focusing techniques are then used to obtain fixed multiple depths of investigation, which techniques are based largely upon an assumption of linearity between conductivity of formation and tool response. Having resistivity measurements at fixed multiple depths of investigation aids geologists in determining important downhole characteristics such as the diameter of the invasion of the drilling mud into the formation, and the corresponding resistivities at various depths into the formation.

As technology has advanced in the exploration and recovery of hydrocarbons, it is now common to include an LWD tool, capable of performing resistivity measurements, as part of the bottomhole assembly (BHA) of a drillstring. LWD resistivity tools have many similarities with their wireline counterparts, which may comprise multiple transmitters spaced apart from a receiver pair, use of electromagnetic wave propagation, and creation of logs of resistivity. However, because of the differences in physical requirements between wireline and LWD tools, the frequency of operation of an LWD tool is typically different than that of a wireline tool. For example, many LWD tools operate at a frequency of 2 megahertz. It has been discovered in the prior art that the depth of investigation of a resistivity tool is also a function of frequency when higher frequencies are used. Thus, a wireline tool and an LWD tool having the same spacing between the transmitters and receiver, because of the differences in frequency, may have different depths of investigation.

There are circumstances, however, where geologists need to compare the measured resistivities as between LWD and wireline devices. For example, a geologist may need to make this comparison when assessing the volume of hydrocarbons remaining in a reservoir. However, comparing the results of an LWD resistivity log performed during drilling, having a first set of depths of investigation, and the results of a wireline log run many months or years thereafter, having a different set of depths of investigation, is difficult. That is to say, it is difficult to compare the results of the logs performed by the two different devices because their depths of investigation are different.

In the prior art, there have been attempts to mathematically modify logs gathered by LWD tools to match the depths of investigation of wireline devices. A paper titled "Multi-Parameter Propagation Resistivity Interpretation," by W. Hal Meyer, presented at the Thirty-Eighth Annual Logging Symposium of the SPWLA, Jun. 15–18, 1997, discusses one such attempt. The Meyer paper and its cited references, teach a technique where the fixed depth of investigation curves are obtained by a linear combination of many raw corrected curves. These fixed depth of investigation curves have the desired radial response functions with fixed depths of investigation that are chosen to be close to those used in induction logging. Each desired response function, denoted as target response function, is produced by a linear combination of elemental response functions of the corrected curves (corrected for shoulder bed effect) of each transmitter-receiver spacing. A set of combination coefficients is then used to combine the corrected data to obtain fixed depth of investigation curves. These coefficients vary with formation resistivity. Meyer teaches calculating the coefficients for a number of discrete selected resistivities in advance, and the coefficients at actual formation resistivity are obtained by interpolation. In Meyer's paper, each response of each receiver/transmitter spacing, which corresponds to specific transmitter-receiver spacing, is calculated by assuming a very thin cylindrical annulus, or invaded zone, around the tool with a resistivity slightly different from the homogeneous background. The difference between this calculated result and the background response of a homogeneous formation is plotted as a function of radial distance—a radial response function. The resulting curve is normalized so that the area under the curve is 1.0, as illustrated by FIG. 3. The depth of investigation (DOI) is defined to be the point which corresponds to one half of the area of the radial response function, also referred to as 50% point. FIG. 2 illustrates radial impulse response functions of an LWD resistivity tool in a 1.0 ohm-m formation. These response functions are obtained by assuming an annulus or invaded zone with "slightly different" resistivity of 0.98 ohm-m, which is the method of Meyer and the prior art.

However, the inventors of the present specification have found that the radial response function calculation of the prior art is only valid when assuming small resistivity differences in the annulus. In the real setting, invaded zone resistivity can be much bigger, or smaller, than the formation resistivity. Under this situation, the nonlinear nature of the LWD resistivity tool response becomes more pronounced. More specifically, the radial response functions change not only with formation background resistivity but also with formation to invaded zone resistivity contrast. For high contrast formation, e.g. 1:10 to 1:100 or more, the response functions calculated using techniques such as Meyer are no longer valid. Therefore, the fixed depth of investigation curves based on these functions are prone to error.

Thus, what is needed in the art is a method that can accurately produce fixed depth of investigation curves regardless of formation resistivity contrast.

BRIEF SUMMARY OF SOME OF THE PREFERRED EMBODIMENTS

The problems noted above are solved in large part by a logging while drilling (LWD) tool that operates under the realization that the depth of investigation in high frequency electromagnetic resistivity tools is affected not only by the frequency of the electromagnetic wave used and the transmitter-to-receiver spacings, but also by the resistivity of the formation, and the resistivity contrast between the invaded zone and formation. More particularly, the specification discloses an electromagnetic resistivity LWD tool preferably having five transmitting antennas spaced apart from each other and from a set of two receiving antennas. Each of the transmitters operates at three distinct frequencies: 2 megahertz, 500 kilohertz, and 250 kilohertz. Thus, the preferred embodiments of the present invention are capable of measuring resistivity of a formation at several different frequencies, and at several different depths of investigation based in part on the transmitter-to-receiver spacing. Using the logs obtained, the formation resistivity and the invaded zone resistivity are determined by inversion techniques. The determined invaded zone and formation resistivity values are used when modeling responses of the tool, rather than mere small difference assumption used in the prior art.

With regard to determining or creating logs of resistivity at fixed depths of investigation different than those realized because of the physical parameters of the tool and the formation, the preferred embodiments perform a least-squares curve fitting algorithm to determine a function that models the relationship between the physical spacing of the transmitter-to-receiver pairs and the depths of investigation. The preferred embodiments also use a least-squares curve fitting algorithm to determine a function that models the relationship between the transmitter-to-receiver spacing and the measured resistivity. In order to convert the realized depths of investigation to other fixed depths of investigation, such as to match those of a wireline tool, the preferred embodiments utilize the function that describes the relationship between the physical spacing and the depths of investigation to determine a fictional physical spacing that, if used, would generate the depths of investigation desired. Once the physical spacing for the desired fixed depth of investigation is determined, the fictional physical spacing is used with the function that relates the physical spacing to measured resistivity to obtain a resistivity reading at the desired fixed depth of investigation.

Thus, the disclosed structure and methods comprise a combination of features and advantages which enable them to overcome the deficiencies of the prior art devices. In particular, the preferred embodiments describe a structure and related method for creating electromagnetic resistivity logs at fixed depths of investigation different than those actually realized by the electromagnetic resistivity tool, and which account for resistivities of the formation and are accurate in high contrast formations. The various characteristics described, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
FIG. 1 shows an exemplary array induction tool.
Figure 2:
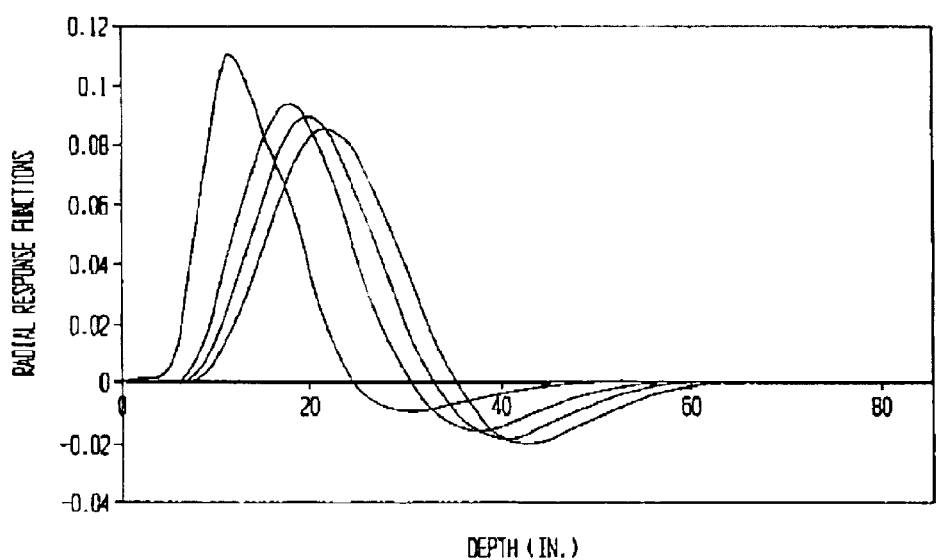
FIG. 2 shows an exemplary set of radial response functions in the prior art at 1.0 ohm-meter.
Figure 3:
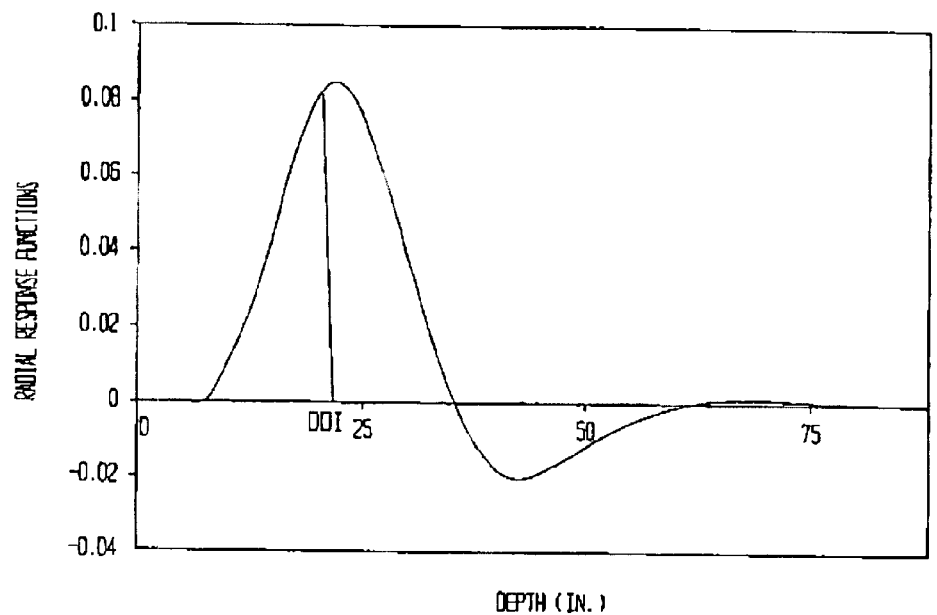
FIG. 3 shows the 50% point of a radial response function for a transmitter-receiver spacing at 1.0 ohm-meter.
Figure 4:
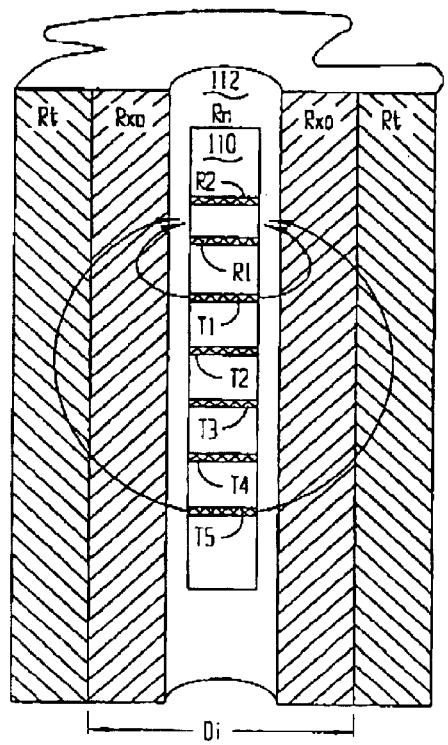
FIG. 4 shows a cross-sectional elevational view of a logging tool disposed within a borehole.

FIG. 4 shows a cross-sectional elevational view of a logging tool 110 disposed within a borehole 112. In the preferred embodiments, the logging tool 110 is part of a bottom hole assembly (BHA) of a drill string; however, the system and methods described herein are equally applicable to wireline devices. The logging tool 110 is preferably an electromagnetic resistivity tool, which may be equivalently referred to as an induction logging tool, comprising a plurality of transmitters or transmitting antennas T1–T5 disposed on the tool body separated from each other as well as from a pair of receivers or receiving antennas R1, R2. While FIG. 4 shows the preferred five transmitting antennas T1–T5, any number of transmitting antennas may be used. The greater the number of transmitting antenna, the greater the accuracy of the fixed depth of investigation process; however, the inventors of the present specification have found that five transmitters produces a sufficient number of data points for an accurate determination.

Still referring to FIG. 4, the preferred embodiments also comprise a pair of receiving antennas R1, R2. Although two receiving antennas are preferred, any number of receiving antennas may be equivalently used. The logging tool 110 is shown to have the receiving antennas placed physically above the transmitting antennas; however, the receiving antennas may be equivalently placed below the transmitting antennas, or may also be equivalently placed within the array of transmitting antennas. In the preferred embodiment, each of the transmitters has the following transmitter to center point of the receiving antennas spacing: T1—16 inches, T2—24 inches, T3—32 inches, T4—40 inches, and T5—48 inches. While these spacings are preferred, they are not required, and thus greater or lesser spacings may be equivalently used.

In drilling through a formation it is common that drilling mud within the borehole 112, because of its depth as well as its specific gravity, has a pressure downhole slightly above the pressure of the hydrocarbons in the formation. Because of this difference in pressure, it is common for the drilling mud to enter or invade the formation, creating an invaded or invasion zone. Because of the differences in resistivity between drilling mud, drilling mud in a porous formation, and hydrocarbons in the porous formation, there exists several resistivity zones. In particular, the drilling mud within the borehole 112 has a resistivity, generally referred to as $R_m$. That portion of the formation into which the drilling mud has invaded (invaded zone) has a resistivity $R_{XO}$. Finally, the formation has a resistivity referred to as $R_t$. The cross-sectional elevational view of FIG. 4 exemplifies the various resistivities encountered, with the understanding that the formation resistivity $R_t$ may extend outward for a significant distance, though this is not specifically shown. Drilling mud invades the formation such that the boundary between the invaded zone and the non-invaded formation creates a substantially circular cylinder having a particular diameter. Thus, for purposes of this discussion, the extent of invasion of the drilling mud is delineated by a diameter $D_i$ being the diameter of the circular cylinder-shaped area defined by the boundary between the invaded zone and non-invaded formation, or equivalently, by $R_i$ being one half of $D_i$.

The depth of investigation realized by a particular transmitter-to-receiver combination is controlled, to some extent, by spacing. FIG. 4 shows that for the transmitter T1 closest to the receiver pair, the depth of investigation may be relatively shallow. Likewise, FIG. 4 shows that for the transmitter T5 farthest from the receiver pair, the depth of investigation may be relatively deep. The drawing of FIG. 4 is meant only to exemplify the different depths of investigation as a function of transmitter spacing, and should not be read to imply that the transmitter T1 of the preferred embodiments is only capable of a depth of investigation within the invaded zone.

The inventors of the present specification have discovered that assumptions of the prior art in calculating the depths of investigation introduce error. In particular, the assumption that the radial response functions obtained assuming a small difference between the invaded zone and formation resistivity is valid for high contrast resistivity formations has been found by the inventors to be incorrect. This assumption results in large errors when formation resistivity contrast is greater than approximately 10 or less than approximately 0.1, and it is not uncommon to encounter a contrast greater than 100 or less than 0.01 in actual logging conditions. It is worth noting that this nonlinearity becomes even more significant when background or average resistivity of the profile is low. The preferred embodiments of the present invention address these factors by using the calculated invaded zone and formation resistivity, determined through inversion techniques, when calculating the realized or actual depths of investigation.

Figure 5:
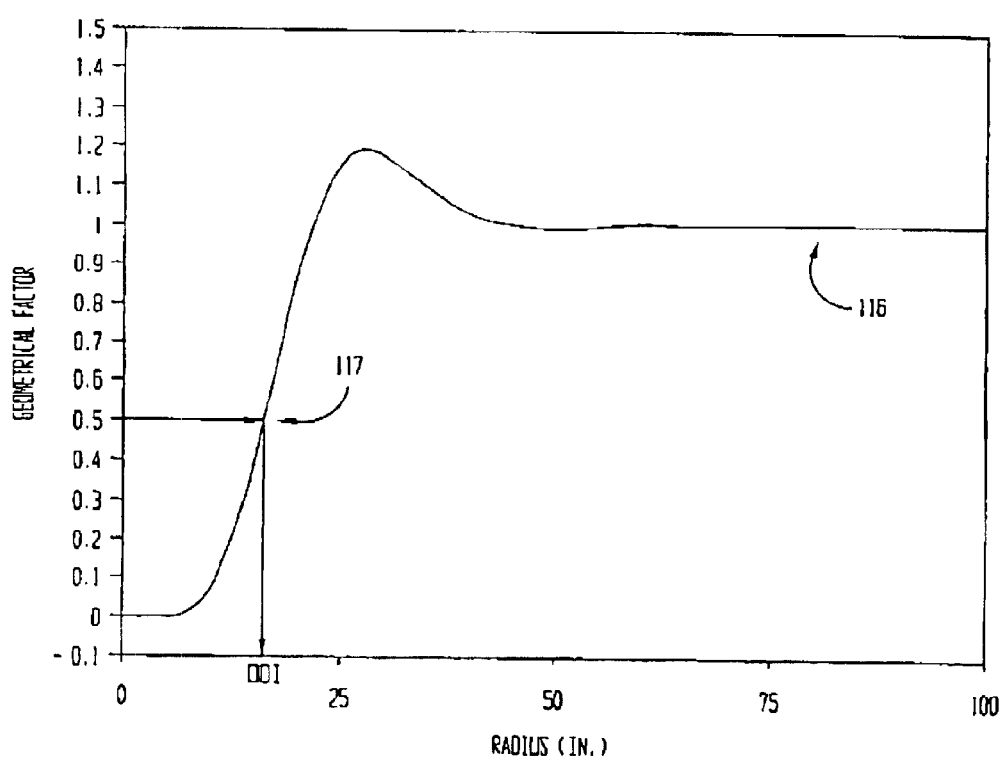
FIG. 5 shows a modeled radial geometrical factor for a transmitter-receiver spacing of an LWD resistivity tool using $R_{xo}=1.0$ Ohm-meter, and $R_t=10.0$ Ohm-meter.

In order to more clearly define calculating depths of investigation in the preferred embodiments, reference is now made to FIG. 5. Curve 116 represents a radial geometrical factor of a transmitter-to-receiver spacing as a function of the radial distance, given $R_{xo}=1$ Ohm-meter, and $R_t=10$ Ohm-meter. Mathematically, each point of the geometrical factor is defined by the following formula, $$G_r = \frac{\sigma_a - \sigma_t}{\sigma_{xo} - \sigma_t}. \qquad (1)$$

where $G_r$ is the geometrical factor, $\sigma_a$ is a modeled apparent conductivity as a function of invaded zone radius, $\sigma_t$ is the formation conductivity (inverse of $R_t$), and $\sigma_{xo}$, is the invaded zone conductivity (inverse of $R_{XO}$). It is point 117 of curve 116, that reads 0.5 on the ordinate, that defines the depth of investigation for a particular transmitter-to-receiver spacing. The reading of point 117 on the abscissa gives the depth of investigation of this spacing under this particular condition with $R_{xo}=1$ Ohm-meter, and $R_t=10$ Ohm-meter. It must be understood that the curve 116 in FIG. 5 varies with $R_{XO}$ and Rt.

Figure 6:
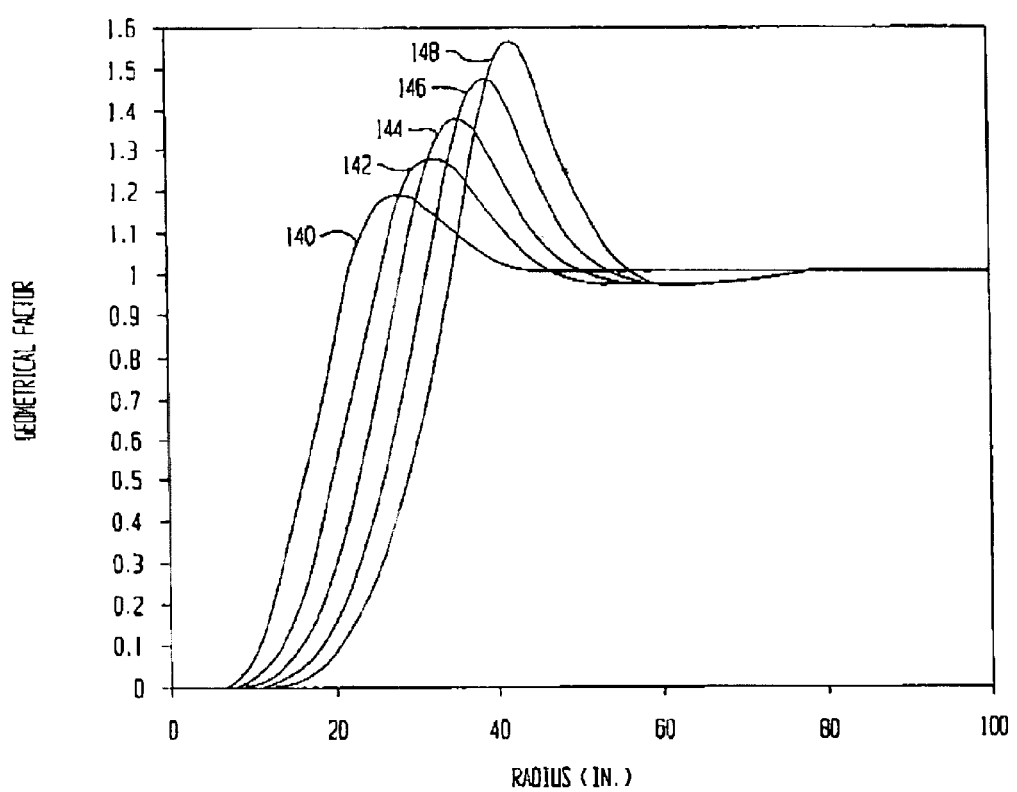
FIG. 6 shows the geometrical factors of a multi-spacing LWD resistivity tool for $R_{xo}=1.0$ Ohm-meter, and $R_t=10.0$ Ohm-meter.

Thus, the first step in calculating the depth of investigation for a particular transmitter to receiver spacing is generation of the exemplary curve 116 of FIG. 5. In the preferred embodiments, calculating curve 116 (for any one of the five transmitters) first involves determining resistivities using known inversion techniques. In particular, the invaded zone resistivity $R_{XO}$, and the formation resistivity $R_t$ are determined using an inversion technique. The Society of Petroleum Engineers (SPE) paper No. 28425, titled "Invasion Profiling with a Multiple Depth of Investigation Electromagnetic Wave Resistivity Sensor," authored by M. S. Bittar, P. F. Rodney and W. E. Hendricks, details one such inversion method, and this paper is incorporated by reference herein as if reproduced in full below. The invaded zone resistivity $R_{XO}$ and formation resistivity $R_t$ are then inserted into an equation that models an electromagnetic response of a formation. The modeled response $\sigma_a$ is calculated for a plurality of invaded zone radii $R_i$ starting at a radius equal to the borehole radius (implying no invasion). Thereafter, the radius of the invaded zone in the model is increased, and the modeled response is plotted for each $R_i$. The difference between this curve $\sigma_a$ (apparent conductivity) and $\sigma_t$ (inverse of $R_t$) divided by the difference between $\sigma_{xo}$ (inverse of $R_{XO}$) and $\sigma_t$ gives the geometrical factor, which may also be referred to as integrated geometrical factor. The point 117 of this curve that has value equal to 0.5 on the ordinate as shown in FIG. 5 determines the depth of investigation. FIG. 6 shows an exemplary set of geometrical factors for a five transmitter system at one frequency. In the exemplary geometrical factor plot of FIG. 6, curve 140 corresponds to transmitter T1, curve 142 corresponds to T2, curve 144 corresponds to transmitter T3, curve 146 corresponds to transmitter T4, and curve 148 corresponds to transmitter T5. As can be now ascertained from FIG. 6, the depths of investigation are a function, in part, of the transmitter-to-receiver spacing.

Figure 7:
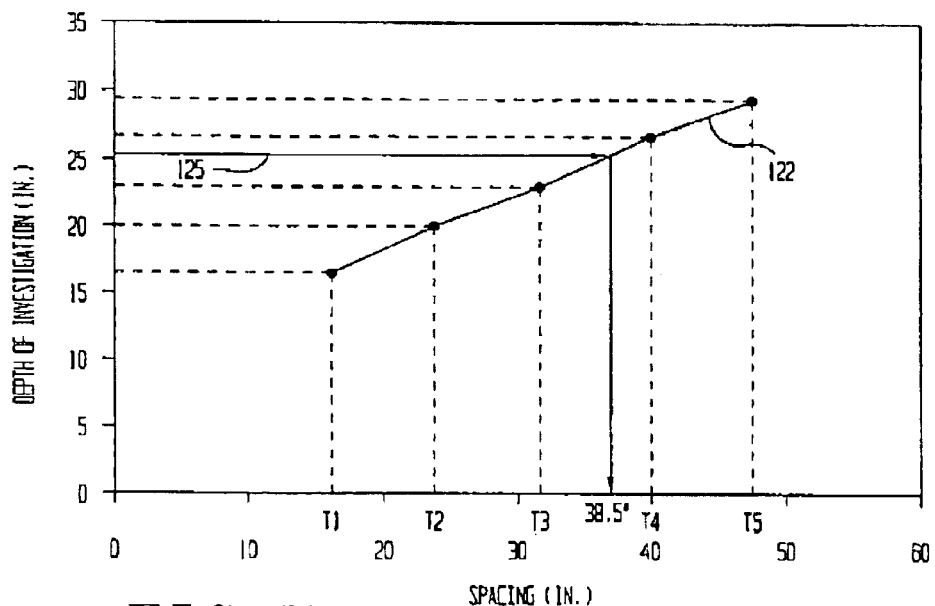
FIG. 7 shows, in graphical form, an exemplary relationship between a depth of investigation and the transmitter-to-receiver spacing for $R_{xo}=1.0$ Ohm-meter, and $R_t=10.0$ Ohm-meter.

While the depth of investigation for a particular transmitter-to-receiver spacing is a function of the spacing, the depth of investigation is not necessarily the same as the spacing. FIG. 7 shows an exemplary graph of transmitter-to-receiver physical spacing versus depth of investigation (DOI). In particular, in FIG. 7 the abscissa is the transmitter-to-receiver (in the preferred embodiments transmitter-to-midpoint of the receiver pair) spacing, and the ordinate is the depth of investigation. FIG. 7 shows the exemplary transmitter spacings of 16 inches, 24 inches, 32 inches, 40 inches and 48 inches may give a depth of investigation of 16.4 inches, 19.7, inches, 22.8 inches, 26.0 inches and 29.0 inches respectively. Depending on the frequency of electromagnetic wave used, and the resistivity of the formation and the invaded zone, the realized depth of investigation may be greater or less than the physical transmitter-to-receiver spacing. FIG. 7 is not meant to define or limit the possible variations in the realized depth of investigation.

Thus, a tool as exemplified in FIG. 4 may have transmitter-to-receiver spacings and depths of investigation as exemplified in FIG. 7; however, the depths of investigation may be, and most likely are, different from the depths of investigation realized by a wireline electromagnetic resistivity tool in the same borehole with the same spacings. Regardless of the reason for the difference in depths of investigation, in order to compare results between an LWD electromagnetic resistivity log and a wireline resistivity log, it is necessary that the depths of investigation substantially match. The preferred embodiments are directed to generating a set of fixed depth of investigation curves or logs to match any desired depth of investigation (for example the depth of investigation of a wireline device). Consider for purposes of explanation that a system such as that shown in FIG. 4 has performed an electromagnetic resistivity test of a borehole and has produced a log. Further consider that the realized depths of investigation of the log are such as those shown in FIG. 7 of 16.4 inches, 19.7 inches, 22.8 inches, 26.0 inches and 29.0 inches. Assume further that, in order to compare the log generated to a log of a wireline device, some translation of the depths of investigation needs to be made. Although in practice several fixed depths of investigation may need to be calculated to have a complete set, consider that a wireline device provides a depth of investigation for one of its transmitter of 25 inches, as indicated by arrow 125 in FIG. 7. In the preferred embodiments, the depths of investigation calculated for each of the transmitters T1–T5 become input parameters to a least-squares curve fitting algorithm. The algorithm preferably estimates an equation or function that models the relationship between the transmitter-to-receiver physical spacing and the depth of investigation. In FIG. 7, the equation that encompasses all the points of the depths of investigation is exemplified as curve or line 122. In most cases, line 122 is close to a straight line. Regardless of the actual shape of the line 122, the equation that approximates line 122 is formed by the depths of investigation calculated. As is seen from the line 122 of FIG. 7, no transmitter-to-receiver spacing in this exemplary system has a depth of investigation of 25 inches. Thus, the next step in the preferred embodiment is calculating, using the equation or function that models a line 122, a transmitter-to-receiver spacing that, if used, would have a realized depth of investigation of 25 inches (a fictional transmitter-to-receiver spacing). Graphically in FIG. 7 we see that the spacing that, if used, which would have provided the 25 inch depth of investigation is approximately 38.5 inches.

Figure 8:
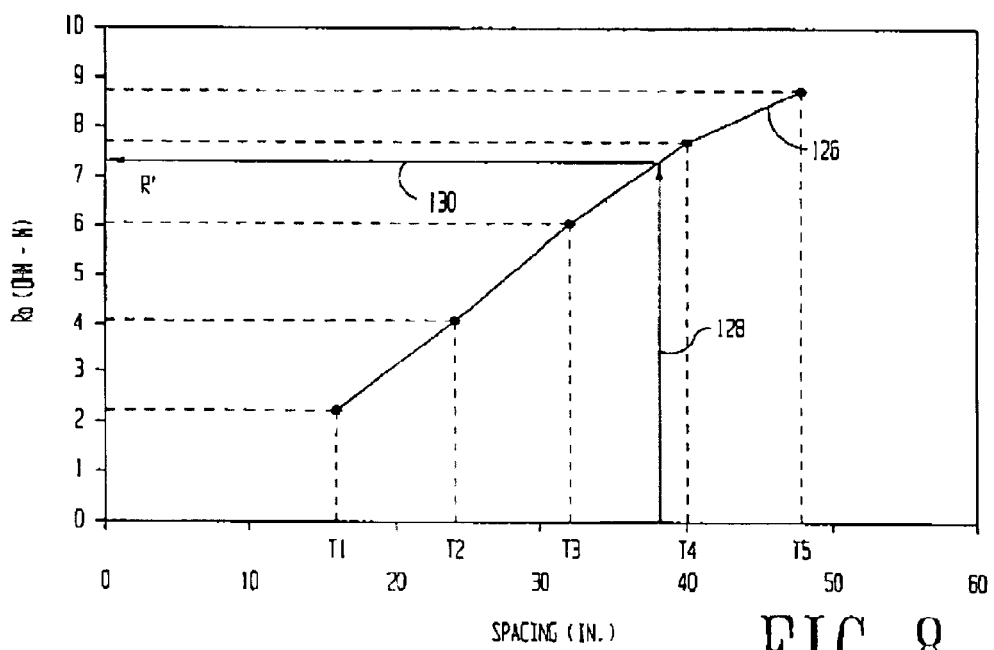
FIG. 8 shows, in graphical form, an exemplary relationship between apparent resistivity and the transmitter to receiver spacing of an exemplary system.

FIG. 8 exemplifies a relationship between the apparent or measured resistivity Ra and the spacing for each of the transmitters of the preferred embodiment T1–T5. In the preferred embodiments a least-squares curve fitting algorithm is used to find an equation or function that models curve or line 126 to include or substantially include the resistivity measurements for each of the transmitter-to-receiver spacings. In determining an apparent resistivity measurement for a depth of investigation for which a specific transmitter spacing does not exist, the fictional transmitter-to-receiver spacing determined with reference to FIG. 7 (in our example 38.5 inches) is inserted into the equal in that models the line 126, and the model is solved for a resistivity reading. As shown graphically in FIG. 8 with lines 128 and 130, a transmitter-to-receiver spacing of approximately 38.5 inches corresponds to a resistivity reading R'.

Figure 9A:
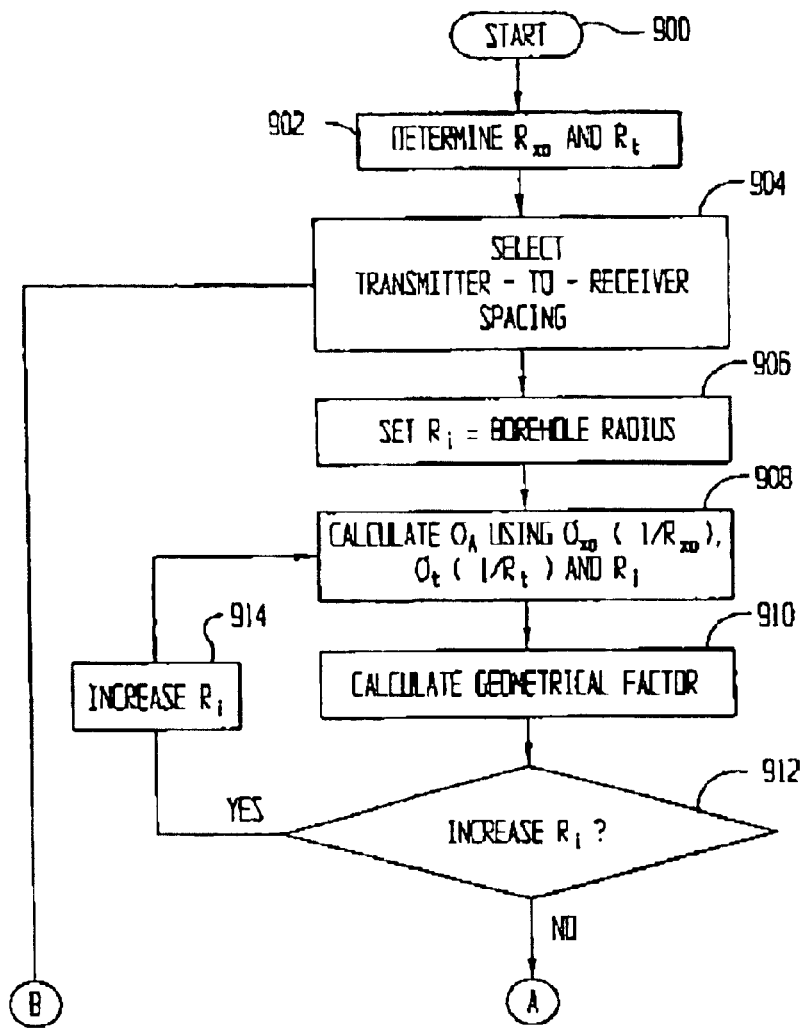
FIGS. 9A–9B show an exemplary flow diagram in accordance with embodiments of the invention.
Figure 9B:
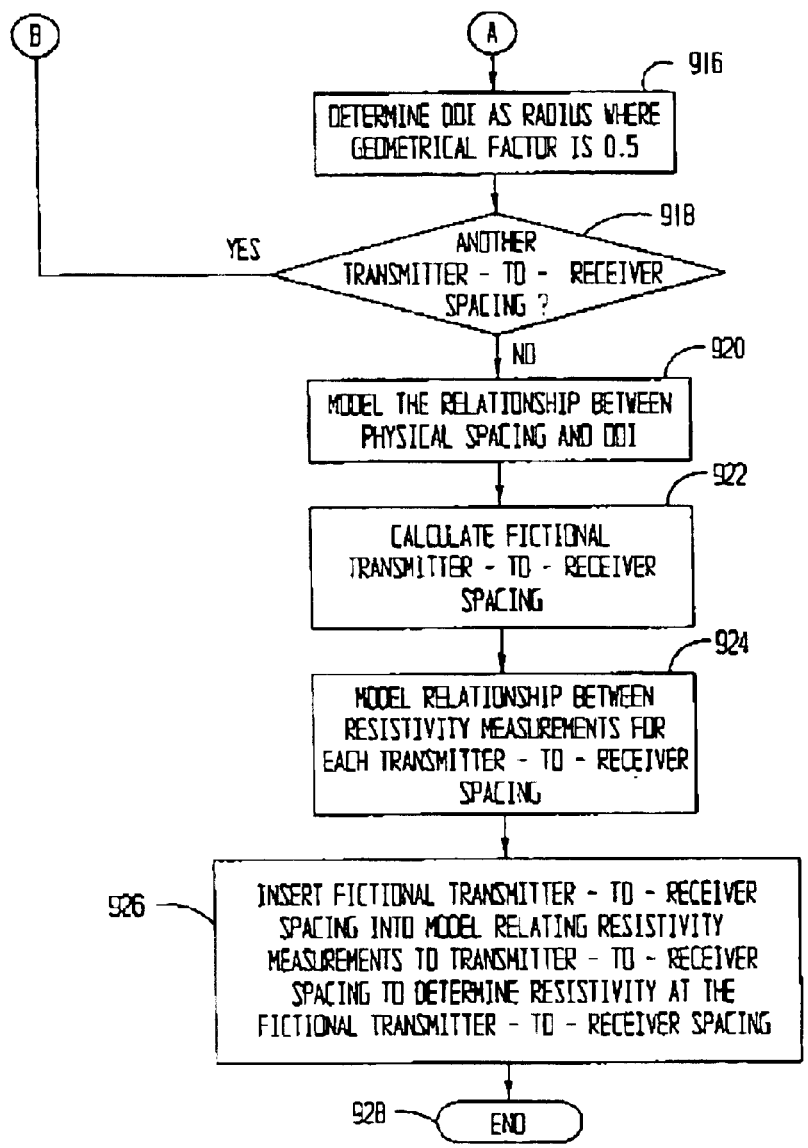

FIGS. 9A–9B illustrate a flow diagram in accordance with embodiments of the invention. In particular, the process may start (block 900) and proceed to determining the invaded zone resistivity $R_{xo}$ and the formation resistivity $R_t$ using an inversion technique (block 902) Next, any one of the five transmitters are selected (block 904). Starting at a radius equal to the borehole radius (implying no invasion)(block 906), the modeled response $\sigma_a$ is calculated (block 908) using invaded zone resistivity $R_{xo}$ formation resistivity $R_t$ and invaded zone radius $R_i$. The difference between $\sigma_a$ (apparent conductivity) and $\sigma_t$ (inverse of $R_t$) divided by the difference between $\sigma_{xo}$ (inverse of $R_{xo}$) and $\sigma_t$ gives the geometrical factor (block 910). The modeled response $\sigma_a$ is calculated for a plurality of invaded zone radii $R_i$ at a radius equal to the borehole radius (implying no invasion), Thereafter, the radius of the invaded zone in the model is increased, and the response modeled (blocks 912, 914). Next the DOI is calculated (block 916). e.g. the point 117 (FIG. 5) where value equal to 0.5. In the preferred embodiments, the depths or investigation calculated for each of the transmitters T1–T5 (block 918) become input parameters to a least-squares curve fitting algorithm (block 920). The algorithm preferably estimates an equation or function that models the relationship between the transmitter-to-receiver physical spacing and the depth of investigation. The next step is calculating a fictional transmitter-to-receiver spacing that, if used, would have a desired depth of investigation (block 922). In the preferred embodiments a least-squares curve fitting algorithm is used to find an equation or function that models curve or line 126 to include or substantially include the resistivity measurements for each of the transmitter-to-receiver spacings (block 924). The fictional transmitter-to-receiver spacing (from block 922) is inserted into the model (from block 924), and the model is solved for a resistivity reading (block 926). Thereafter the process ends (block 928).

In the preferred embodiments, the steps described above (determining a transmitter-to-receiver spacing that corresponds to a desired depth of investigation, and then determining a resistivity measurement using the assumed transmitter-to-receiver spacing) is performed for each fixed depth of investigation measurement desired. To create an entire log having the desired fixed depths of investigation, the steps outlined above are performed on a plurality of curves, such as those shown in FIG. 7 and FIG. 8, with each set of curves corresponding to a particular elevation within the borehole. By making the calculation at a plurality of elevations, a set of resistivity logs, having the desired fixed depths of investigation, may be generated in spite of the fact that the actual depths of investigation for the tool 110 are different than those fixed depths of investigation desired. Having generated the desired resistivity logs at the desired fixed depths of investigation, it is thus possible for geologists or geophysicists to more accurately compare the results from different resistivity tools.

The tool 110 of the preferred embodiment has the capability of generating three distinct frequencies at each transmitter: namely, 2 megahertz, 500 kilohertz, and 250 kilohertz. The discussion above is equally applicable to each of these distinct frequencies of operation. Thus, it is possible to calculate fixed depths of investigation for each of these operational frequencies. Moreover, it is possible that the fixed depth of investigation created may be made using only one of these frequencies, or may be a combination of these frequencies. Finally, in some formations, it may be that the lower frequencies (500 kilohertz and 250 kilohertz) do not exhibit as significant nonlinearity effects as does the 2 megahertz operational frequency. In these cases, it may be that a portion of the methods described above, namely determining actual formation resistivity and invaded zone resistivity as part of the initial modeling, may be disregarded, and instead mere assumptions used regarding the resistivity, in combination with the curve fitting algorithm methods and determination described, and these methods too would be within the contemplation of this invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modification, for example the input data of the present method can be either raw data or corrected data. However, the preferred embodiment uses corrected data as the input data. Moreover, the preferred embodiments envision using all actual data points when calculating functions (such as the functions that model curves 122 of FIG. 7 and curve 126 of FIG. 8); however, it is within the contemplation of this invention that only a few of the data points are used. For example, if some of the data points are particularly noisy or obviously contaminated by tool malfunctioning, these data points should be excluded in the curve or function fitting.

What is claimed is:

1. A method of operating a logging tool, comprising:
    calculating depths of investigation for a plurality of actual transmitter-to-receiver spacings of the logging tool comprising:
        determining an invaded zone resistivity and a formation resistivity; and
        using the invaded zone resistivity and formation resistivity in calculating the depths of investigation,
    determining a transmitter-to-receiver spacing that corresponds to a desired depth or investigation different than the depths of investigation from the calculating step; and
    estimating a resistivity at the transmitter-to-receiver spacing that corresponds to the desired depth of investigation using the depths of investigation from the calculating step; and
    producing a log of the resistivity at the desired depth of investigation.

2. The method as defined in claim 1 wherein determining an invaded zone resistivity and a formation resistivity further comprises calculating the invaded zone resistivity and the formation resistivity using inversion techniques.

3. The method as defined in claim 1 wherein determining depths of investigation for a plurality of actual transmitter-to-receiver spacings of the logging tool further comprises, for each of the plurality of actual transmitter to receiver spacings:
    determining a modeled response of a resistivity measurement using the invaded zone and formation resistivity for a plurality of invasion zone diameters; and
    determining a depth of investigation from the modeled response.

4. The method as defined in claim 3 wherein determining a depth of investigation from the modeled response further comprises calculating a geometrical factor using substantially the following equation:

$$G_r = \frac{\sigma_a - \sigma_t}{\sigma_{xo} - \sigma_t}$$

where $G_r$ is the geometrical factor, $\sigma_a$ is the modeled apparent conductivity as a function of radius, $\sigma_t$ the inverse of the formation resistivity, and $\sigma_{xo}$ is the inverse of the invaded zone resistivity, and where the depth of investigation is the radius where the geometrical factor is approximately 0.5.

5. The method an defined in claim 1 wherein determining a transmitter-to-receiver spacing that corresponds to a desired depth of investigation further comprises:
    determining a first function that models a relationship between the depths of investigation and the plurality of actual transmitter-to-receiver spacings; and
    using the first function to determine the transmitter-to-receiver spacing that corresponds to the desired depth of investigation.

6. The method as defined in claim 5 wherein determining a first function that models a relationship between the depths of investigation and the plurality of actual transmitter-to-receiver spacings further comprises performing a least-squares algorithm to determine the first function.

7. The method as defined in claim 5 wherein using the first function to determine a transmitter-to-receiver spacing that corresponds to the desired depth of investigation further comprises:
    inserting the desired depth of investigation into the first function; and
    solving the first function for the transmitter-to-receiver spacing that corresponds to the desired depth of investigation.

8. The method as defined in claim 5 wherein estimating a resistivity at the transistors-to-receiver spacing that corresponds to the desired depth of investigation further comprises:
    determining a second function that models a relationship between measured resistivities and the actual transmitter-to-receiver spacings; and
    using the second function to determine the resistivity at the transmitter-to-receiver spacing that corresponds to the desired depth of investigation.

9. The method as defined in claim 8 wherein using the second function to determine the resistivity at the transmitter-to-receiver spacing that corresponds to the desired depth of investigation further comprises
    inserting the transmitter-to-receiver spacing that compounds to the desired depth of investigation into the second function; and
    solving the second function for the resistivity.

10. A method of operating a logging tool, comprising:
    transmitting an electromagnetic wave from the logging tool into an earth formation
    receiving the electromagnetic wave on the logging tool, an attenuation and phase shift experienced by the electromagnetic wave indicative of the resistivity of the earth formation;
    determining a resistivity of an invaded and non-invaded portions of the earth formation;
    calculating a depth of investigation of the electromagnetic wave using the resistivity of the invaded and non-invaded portions of the earth formation.

11. The method as defined in claim 10 wherein determining a resistivity of an invaded and non-invaded portions of the earth formation further comprises determining the resistivity of the invaded and non-invaded portions of the earth formation using inversion techniques.

12. The method as defined in claim 10 wherein calculating a depth of investigation of the electromagnetic wave using the resistivity of the invaded and non-invaded portions of the earth formation further comprises:
   determining a modeled response of a resistivity measurement using the invaded zone mud formation resistivity for a plurality of invasion zone diameters; and
   determining a depth of investigation from the modeled response.

13. The method as defined in claim 12 wherein determining a depth of investigation from the modeled response farther comprises calculating a geometrical factor using substantially the following equation:

$$G_r = \frac{\sigma_a - \sigma_t}{\sigma_{xo} - \sigma_t}$$

where $G_r$ is the geometrical factor, $\sigma_a$ is the modeled apparent conductivity as a function of radius, $\sigma_t$ is the inverse of the formation resistivity, and $\sigma_{xo}$ is the inverse of the invaded zone resistivity and where the depth of investigation is the radius where the geometrical factor is approximately 0.5.

14. A method comprising:
   determining a resistivity of an invaded and non-invaded portions of an earth formation using measured resistivities from a plurality of actual transmitter-to-receiver spacings of a logging tool:
   calculating depths of investigation of the plurality of actual transmitter-to-receiver spacings utilizing the resistivity of the invaded and non-invaded portions of the earth formation in the determining a resistivity step;
   determining a fictitious transmitter-to-receiver spacing of the logging tool which, if used, would result in a desired depth of investigation different than the depths of investigation from the calculating step;
   estimating a resistivity at the fictitious transmitter-to-receiver spacing; and
   generating a log of the estimated resistivity at the fictitious transmitter-to-receiver spacing.

15. The method as defined in claim 14 wherein determining a resistivity of an invaded and non-invaded portions of the earth formation using measured resistivities from a plurality of actual transmitter-to-receiver spacings further comprises determining the resistivity of the invaded and non-invaded portions of the earth formation using inversion techniques.

16. The method as defined in claim 14 wherein calculating depths of investigation of the plurality of actual transmitter-to-receiver spacings further comprises, for each actual transmitter to receiver spacing:
   determining a modeled response of a resistivity measurement using the invaded zone and formation resistivity for a plurality of invasion zone diameters; and
   determining a depth of investigation from the modeled response.

17. The method as defined in claim 16 wherein determining a depth of investigation from the modeled response further comprises calculating a geometrical factor using substantially the following equation:

$$G_r = \frac{\sigma_a - \sigma_t}{\sigma_{xo} - \sigma_t}$$

where $G_r$ is the geometrical factor, $\sigma_a$ is the modeled apparent conductivity as a function of radius, $\sigma_t$ is the inverse of the formation resistivity, and $\sigma_{xo}$ is the inverse of the invaded zone resistivity, and where the depth of investigation is the radius where the geometrical factor is approximately 0.5.

18. The method as defined in claim 16 wherein determining a modeled response of a resistivity measurement using the invaded zone and formation resistivity for a plurality of invasion zone diameters further comprises:
   applying the resistivity of the invaded and non-invaded portions to a model that predicts a resistivity measurement based on the resistivity of the invaded and non-invaded portions and a diameter of the invaded zone; and
   calculating the predicted resistivity measurement for a plurality of diameters.

19. The method as defined in claim 14 wherein determining a fictitious transmitter-to-receiver spacing which, if used, would result in a desired depth of investigation further comprises:
   curve fitting the depths of investigation for the plurality of transmitter-to-receiver spacings to determine a first function that models a relationship between the depths of investigation and the transmitter-to-receiver spacings; and
   applying the desired depth of investigation to the first function and solving for the fictitious transmitter-to-receiver spacing.

20. The method as defined in claim 19 wherein curve fitting further comprises performing a least squares algorithm to determine the first function.

21. The method as defined in claim 14 wherein estimating a resistivity at the fictitious transmitter-to-receiver spacing further comprises:
   curve fitting the measured resistivities to determine a second function that models a relationship between the measured resistivities and the plurality of transmitter-to-receiver spacings; and
   applying the fictitious transmitter-to-receiver spacing to the second function and solving for resistivity.

22. The method as defined in claim 21 wherein curve fitting further comprises performing a least squares algorithm to determine the second function.

* * * * *